(12) United States Patent
Park et al.

(10) Patent No.: US 11,457,194 B2
(45) Date of Patent: Sep. 27, 2022

(54) THREE-DIMENSIONAL (3D) IMAGE RENDERING METHOD AND APPARATUS

(71) Applicant: SAMSUNG ELECTRONICS CO., LTD., Suwon-si (KR)

(72) Inventors: Juyong Park, Seongnam-si (KR); Dong Kyung Nam, Yongin-si (KR); Kyuhwan Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/727,031

(22) Filed: Dec. 26, 2019

(65) Prior Publication Data

US 2020/0134912 A1 Apr. 30, 2020

Related U.S. Application Data

(63) Continuation of application No. 15/790,579, filed on Oct. 23, 2017, now Pat. No. 10,521,953.

(30) Foreign Application Priority Data

Nov. 22, 2016 (KR) .................. 10-2016-0155689

(51) Int. Cl.
*G06T 15/20* (2011.01)
*G06T 7/593* (2017.01)
(Continued)

(52) U.S. Cl.
CPC ......... *H04N 13/117* (2018.05); *H04N 13/305* (2018.05); *H04N 13/31* (2018.05);
(Continued)

(58) Field of Classification Search
USPC ........................................... 348/51
See application file for complete search history.

(56) References Cited

U.S. PATENT DOCUMENTS

| 2003/0080923 A1 | 5/2003 | Suyama et al. |
| 2007/0188667 A1 | 8/2007 | Schwerdtner |

(Continued)

FOREIGN PATENT DOCUMENTS

| JP | 2009-229752 A | 10/2009 |
| JP | 2011-85790 A | 4/2011 |

(Continued)

OTHER PUBLICATIONS

Communication dated Apr. 24, 2018 issued by the European Patent Office in counterpart European Patent Application No. 17202721.1.
Jung et al., "Numerical simulation of the displayed image on the entire screen of autostereoscopic displays", Mar. 23, 2015, vol. 23, No. 6, Optics Express, pp. 7842-7855 (Year 2015).

(Continued)

*Primary Examiner* — Patricia I Young
(74) *Attorney, Agent, or Firm* — Sughrue Mion, PLLC

(57) ABSTRACT

A three-dimensional (3D) image rendering method for a heads-up display (HUD) system including a 3D display apparatus and a catadioptric system is provided. The 3D image rendering method includes determining optical images corresponding to both eyes of a user by applying, to each of the positions of the eyes, an optical transformation that is based on an optical characteristic of the catadioptric system, and rendering an image to be displayed on a display panel included in the 3D display apparatus, based on a position relationship between the optical images and the display panel.

13 Claims, 10 Drawing Sheets

(51) Int. Cl.
    *G06T 15/00* (2011.01)
    *G06T 15/08* (2011.01)
    *G06T 15/50* (2011.01)
    *H04N 13/117* (2018.01)
    *H04N 13/305* (2018.01)
    *H04N 13/31* (2018.01)
    *H04N 13/32* (2018.01)
    *H04N 13/376* (2018.01)
    *H04N 13/302* (2018.01)
    *H04N 13/315* (2018.01)
    *G06F 3/13* (2006.01)
    *G06F 3/01* (2006.01)
    *H04N 13/00* (2018.01)

(52) U.S. Cl.
    CPC ........... *H04N 13/32* (2018.05); *H04N 13/376* (2018.05); *G06F 3/013* (2013.01); *G06T 7/593* (2017.01); *G06T 15/205* (2013.01); *H04N 2013/0074* (2013.01)

(56) References Cited

U.S. PATENT DOCUMENTS

| | | |
|---|---|---|
| 2011/0188116 A1 | 8/2011 | Ledentsov |
| 2014/0049622 A1 | 2/2014 | Tsurumi et al. |
| 2014/0168390 A1 | 6/2014 | Cho et al. |
| 2015/0145977 A1 | 3/2015 | Hoffman |
| 2015/0226965 A1 | 8/2015 | Kim et al. |
| 2016/0073098 A1 | 3/2016 | Villalobos Martinez et al. |
| 2016/0198148 A1 | 7/2016 | Asai |
| 2017/0085867 A1* | 3/2017 | Baran .................... B41M 3/008 |
| 2017/0155893 A1 | 6/2017 | Mather et al. |

FOREIGN PATENT DOCUMENTS

| | | |
|---|---|---|
| KR | 10-2012-0067854 A | 6/2012 |
| KR | 10-2013-0061042 A | 6/2013 |

OTHER PUBLICATIONS

Communication dated Nov. 2, 2021 issued by the Japanese Patent Office in Japanese Application No. 2017-224795.

* cited by examiner

THREE-DIMENSIONAL (3D) IMAGE RENDERING METHOD AND APPARATUS

CROSS-REFERENCE TO RELATED APPLICATION

This is a continuation application of U.S. patent application Ser. No. 15/790,579, filed Oct. 23, 2017, in the U.S. Patent and Trademark Office, which claims priority from Korean Patent Application No. 10-2016-0155689, filed on Nov. 22, 2016, in the Korean Intellectual Property Office, the disclosures of which are incorporated by reference herein in their entireties.

BACKGROUND

1. Field

Methods and apparatuses consistent with exemplary embodiments relate to a three-dimensional (3D) image rendering method and apparatus.

2. Description of the Related Art

The most dominant factor in a person's perception of a three-dimensional (3D) image is a difference between the image which reaches the person's right eye and the image which reaches the person's left eye. A scheme for presenting different images to the left and right eyes of a user, and thereby displaying a 3D image, may include, for example, a glasses scheme and a glasses-free scheme. In a glasses scheme, the direction of a desired image to the appropriate eye of the viewer may be performed by filtering using a polarized light division method, a time division method, or a wavelength division method in which a wavelength of a primary color is filtered. In a glasses-free scheme, the images to be received by the left and right eyes of the viewer may each be made to be visible in a predetermined space using a 3D conversion apparatus, for example, a parallax barrier, a lenticular lens or a directional backlight unit (BLU). The glasses-free scheme may reduce an inconvenience of wearing glasses. For example, the 3D image may be provided by an optical system, for example, a mirror or a lens. In this example, a direction of light may be changed by the optical system. Accordingly, in such a system, the change in the direction of the light may need to be taken into consideration in the rendering of the 3D image.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a three-dimensional (3D) image rendering method for a heads-up display (HUD) system comprising a 3D display apparatus and a catadioptric system, the 3D image rendering method including acquiring positions of both eyes of a user, determining optical images corresponding to the eyes of the user by applying, to each of the positions of the eyes, an optical transformation that is based on an optical characteristic of the catadioptric system, and rendering an image to be displayed on a display panel included in the 3D display apparatus to provide the user with a 3D image, based on a position relationship between the optical images and the display panel.

The rendering the image may include acquiring a direction of a ray corresponding to a pixel included in the display panel, the direction of the ray including a direction in which a transmission path of the ray is extended toward a rear surface of the display panel, and determining sampling information for determining a value of the pixel by comparing the optical images and the direction of the ray.

The catadioptric system may include a concave mirror or a convex mirror.

The direction of the ray may be determined based on a first refractive index of a medium disposed between the display panel and an optical layer in the 3D display apparatus and a second refractive index of a medium disposed outside the 3D display apparatus and the optical layer.

The optical images may be located behind the display panel.

The rendering the image may include determining rays passing through a pixel of the display panel and optical elements of an optical layer in the 3D display apparatus, comparing directions of the rays and positions of the optical images, and assigning a pixel value to the pixel based on a result of the comparing.

According to an aspect of another exemplary embodiment, there is provided a HUD system including a 3D display apparatus configured to display an image, a catadioptric system configured to magnify an image output by the 3D display apparatus and to transfer the image to a user, a sensor configured to track positions of both eyes of the user, and a processor configured to determine optical images corresponding to the eyes of the user by applying, to each of the positions of the eyes, an optical transformation that is based on an optical characteristic of the catadioptric system, and to render an image to be displayed on a display panel included in the 3D display apparatus to provide the user with a 3D image, based on a position relationship between the optical images and the display panel.

The processor may be further configured to acquire a direction of a ray corresponding to a pixel included in the display panel, the direction of the ray including a direction in which a path of the ray is extended toward a rear surface of the display panel, and to determine sampling information for determining a value of the pixel by comparing the optical images and the direction of the ray.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Figure 1:
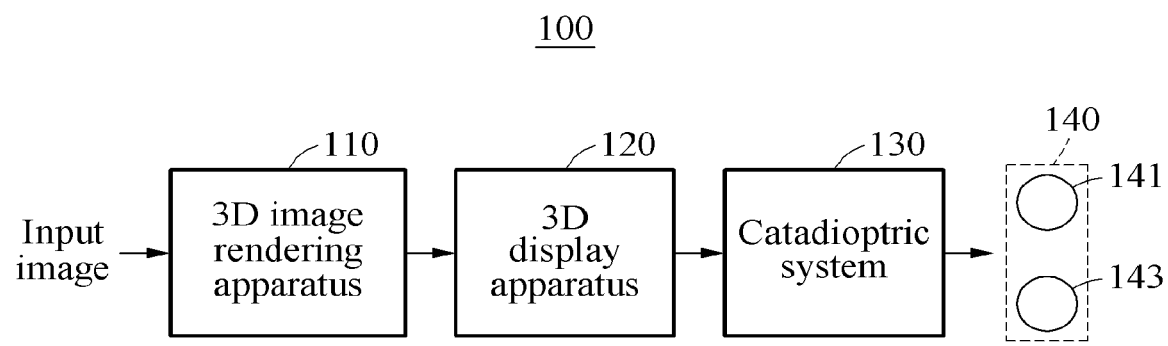
FIG. 1 is a diagram illustrating a three-dimensional (3D) image rendering system according to an exemplary embodiment.

The following structural or functional descriptions are exemplary and used merely to describe the exemplary embodiments. The scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concepts of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, exemplary embodiments will be described in detail with reference to the accompanying drawings, and like reference numerals in the drawings refer to like elements throughout.

FIG. 1 is a diagram illustrating a three-dimensional (3D) image rendering system 100 according to an exemplary embodiment. Referring to FIG. 1, the 3D image rendering system 100 includes a 3D image rendering apparatus 110, a 3D display apparatus 120 and a catadioptric system 130.

The 3D display apparatus 120 may include a display panel and an optical layer. The optical layer may be, for example, one of a parallax barrier, a lenticular lens, and a directional backlight unit (BLU). The display panel may include a plurality of pixels, and the 3D image rendering apparatus 110 may assign pixel values corresponding to a preset number of viewpoint positions to the plurality of pixels, based on an input image. For example, the 3D image rendering apparatus 110 may assign a pixel value corresponding to a first viewpoint position 141 to a first pixel, and may assign a pixel value corresponding to a second viewpoint position 143, to a second pixel. In the following description, the first viewpoint position 141 and the second viewpoint position 143 may be referred to as "candidate viewpoint positions." Depending on the exemplary embodiments, the candidate viewpoint positions may include a left viewpoint position and a right viewpoint position for a single user, as shown, for example, in FIG. 1, or may include a preset number of viewpoint positions for multiple views. The display panel may display a panel image based on pixel values assigned by the 3D image rendering apparatus 110.

Light output by a light source may be provided to the pixels of the display panel. The light source may include, for example, a BLU located behind the display panel or a directional BLU that is an example of the optical layer. For example, when light is provided to the pixels, light corresponding to pixel values of the pixels may be visible to a user. In this example, the optical layer may limit a direction in which the light is made visible to the user. For example, a parallax barrier may output light in limited directions my means of slits arranged at regular intervals, and a lenticular lens may output light in limited directions my means of the curve of the lenticular lens. Also, a directional BLU may provide light in limited directions to the display panel.

For example, light output in a direction corresponding to the first viewpoint position 141 may be provided to the pixel to which the pixel value corresponding to the first viewpoint position 141 is assigned, and light output in a direction corresponding to the second viewpoint position 143 may be provided to the pixel to which the pixel value corresponding to the second viewpoint position 143 is assigned. A user in a viewing zone 140 may view an image corresponding to the first viewpoint position 141 at the first viewpoint position 141, and may view an image corresponding to the second viewpoint position 143 at the second viewpoint position 143. When the first viewpoint position 141 and the second viewpoint position 143 respectively correspond to a right eye and a left eye of a user, the user may perceive a 3D effect while viewing the different images with the right and left eyes.

An image output by the 3D display apparatus 120 may be provided to a user through the catadioptric system 130. The catadioptric system 130 may include a mirror corresponding to a reflecting optical system, or a lens corresponding to a refracting optical system. The 3D display apparatus 120 may be implemented by a small screen, and the catadioptric system 130 may magnify an image output by the 3D display apparatus 120. For example, the 3D display apparatus 120 and the catadioptric system 130 may be implemented as elements of a heads-up display (HUD). In this example, the catadioptric system 130 may include a concave mirror or a convex lens, and the concave mirror may have semitransparent properties.

To assign a pixel value to a pixel of the display panel, the 3D image rendering apparatus 110 may analyze a path of light passing through the pixel. In the following description, light passing through a pixel of the display panel may be referred to as a "ray." For example, when a ray passing through a first pixel is provided to the first viewpoint position 141, the 3D image rendering apparatus 110 may assign a pixel value corresponding to the first viewpoint position 141 to the first pixel.

The 3D image rendering apparatus 110 may utilize the refractive index of the 3D display apparatus 120. A first refractive index of a medium disposed between the display panel and the optical layer may be different from a second refractive index of a medium disposed outside the 3D display apparatus 120. For example, a gap between the display panel and the optical layer may be filled with a medium used to attach the display panel to the optical layer, and air may be outside the 3D display apparatus 120. In this example, the first refractive index may be determined by the medium disposed between the display panel and the optical layer, and the second refractive index may be "1," which is the refractive index of air. The 3D image rendering apparatus 110 may determine the path of a particular ray based on the refraction of the ray due to the difference between the first and second refractive indices.

In an example, a refractive index of the medium disposed between the display panel and the optical layer may be similar to a refractive index of the display panel and/or a refractive index of the optical layer. Also, a thickness of the display panel and/or a thickness of the optical layer may be significantly less than a distance between the display panel and the optical layer. Accordingly, in consideration of refraction of light, the refractive index of the display panel and/or the refractive index of the optical layer may be ignored. In another example, the refractive index of the medium disposed between the display panel and the optical layer may be a representative value of refractive indices based on both the refractive index of the display panel and the refractive index of the optical layer.

Based on a Snell's law, when light passes through a boundary between media with different refractive indices, a sine value of an angle of incidence and a sine value of an angle of reflection may be determined based on the refractive indices of the media. Thus, a direction of a ray may be predicted based on an approximate value based on refractive indices of media and a thickness of a parallax barrier or a lenticular lens. However, because the approximate value is based on an operation in which a ratio of tangent values instead of a ratio of sine values is inversely proportional to a ratio of refractive indices, an error may occur by which it is impossible to approximate a sine value to a tangent value.

In an example, when a normal direction and a direction in which light is refracted are slightly different from each other, a relatively small error due to the approximate value may occur. In another example, when the normal direction and the direction in which light is refracted are greatly different from each other, an artifact may be observed in a 3D image due to an increase in a difference between the approximate value and a direction in which light is actually refracted. The artifact caused by the approximate value may increase with an increase in the size of the 3D display apparatus 120. In order to address these issues, the 3D image rendering apparatus 110 may individually apply an operation, based on the refractive index to each of the pixels of the display panel, and accordingly it is possible to prevent such an undesired artifact from occurring.

A path of a ray output by the 3D display apparatus 120 may be changed by the catadioptric system 130. For example, the catadioptric system 130 may change the path of the ray, in order to magnify an image. The 3D image rendering apparatus 110 may assign a pixel value based on the influence on a ray by the catadioptric system 130. To assign a pixel value based on an optical image corresponding to an image output by the 3D display apparatus 120 and actual viewpoint positions, for example, the first viewpoint position 141 and the second viewpoint position 143, a complex operation may be required to optically transform a line corresponding to a transmission path of a ray. The 3D image rendering apparatus 110 may determine optical images associated with the first viewpoint position 141 and the second viewpoint position 143, and may assign a pixel value based on a position relationship between the optical images and the 3D display apparatus 120. In this example, points corresponding to actual viewpoint positions, for example, the first viewpoint position 141 and the second viewpoint position 143 may need to be optically transformed, and accordingly the influence on the ray by the catadioptric system 130 may be addressed with a relatively simple calculation in comparison to an optical transformation of a line.

When the directions of respective rays are determined, the 3D image rendering apparatus 110 may assign pixel values to pixels of the display panel. For example, the 3D image rendering apparatus 110 may compare the directions of the rays and positions of optical images corresponding to the first viewpoint position 141 and the second viewpoint position 143, and may directly determine which viewpoint position corresponds to each pixel. The optical images corresponding to the first viewpoint position 141 and the second viewpoint position 143 may be located behind the 3D display apparatus 120, which will be further described below. The 3D image rendering apparatus 110 may allow rays to travel towards a back side of the 3D display apparatus 120 and may determine which one of the optical images corresponding to the first viewpoint position 141 and the second viewpoint position 143 is closer to each of the rays. For example, when a first ray travels from the back side of the 3D display apparatus 120 towards the optical image corresponding to the first viewpoint position 141, the 3D image rendering apparatus 110 may assign a pixel value corresponding to the first viewpoint position 141 to the pixel that outputs the first ray.

In another example, the 3D image rendering apparatus 110 may indirectly determine a viewpoint position corresponding to a pixel based on a distance between an optical element and virtual rays that are based on the first viewpoint position 141 and the second viewpoint position 143. The optical element may be an element (for example, a slit of a parallax barrier or a curve of a lenticular lens) configured to transmit light that travels in a limited direction. For example, the 3D image rendering apparatus 110 may determine a first virtual ray passing through a predetermined pixel and the first viewpoint position 141 and a second virtual ray passing through the predetermined pixel and the second viewpoint position 143. In this example, when a distance between the first virtual ray and an optical element adjacent to the first virtual ray is less than a distance between the second virtual ray and an optical element adjacent to the second virtual ray, the 3D image rendering apparatus 110 may assign a pixel value corresponding to the first viewpoint position 141 to the pixel.

Figure 2:
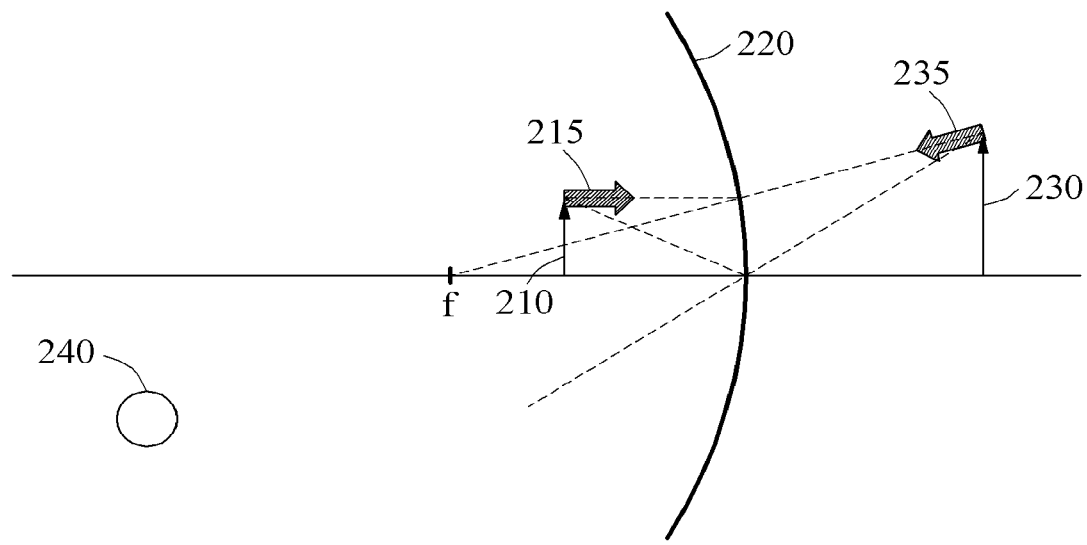
FIGS. 2 and 3 are diagrams illustrating examples of a process of rendering a 3D image using a concave mirror according to an exemplary embodiment.
Figure 3:
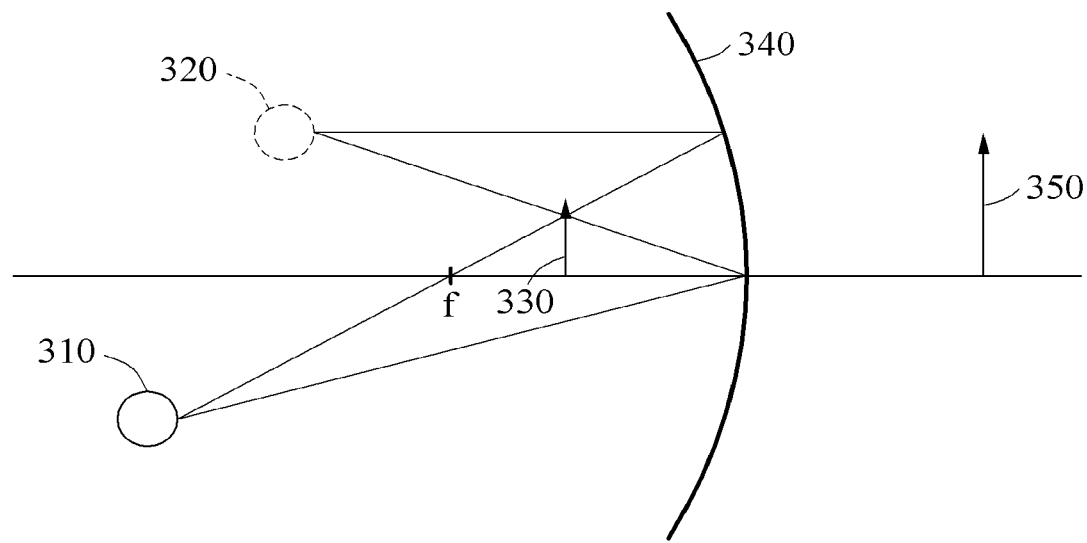

FIGS. 2 and 3 are diagrams illustrating examples of a process of rendering a 3D image using a concave mirror according to an exemplary embodiment. Referring to FIG. 2, a virtual object 210 may be output by a 3D display apparatus. Accordingly, a position of the virtual object 210 may correspond to a position of the 3D display apparatus. A projected location 230 of the virtual object 210 may be determined by applying an optical transformation to the virtual object 210. Because the virtual object 210 is located within the focal point f of a concave mirror 220, the projected location 230 of the virtual object may be a magnified erect virtual image. The optical transformation may be performed based on an optical characteristic of the concave mirror 220 including the focal point for the curve of the mirror 220. A single concave mirror is illustrated in FIGS. 2 and 3, however, the exemplary embodiment is not limited thereto. Any of various optical systems for generating a similar optical effect to that of a single concave mirror may be used instead of the single concave mirror.

A user may observe the projected location 230 of a virtual object at a viewpoint position 240. The 3D display apparatus may output an image representing the virtual object 210 in a direction indicated by an arrow 215. However, the user may observe the projected location 230 of the object in a direction indicated by an arrow 235. Accordingly, an influence by the concave mirror 220 is considered in determining the viewpoint position corresponding to a particular pixel of a display panel. The 3D image rendering apparatus may apply an optical transformation to the viewpoint position 240 and may assign a pixel value to a pixel of the display panel taking into consideration the relationship between the virtual object 210 and the viewpoint position 240, regardless of an influence on all pixels of the display panel by the concave mirror 220. For example, in FIG. 3, the optical transformation may be applied to a viewpoint position 310.

FIG. 3 illustrates a virtual viewpoint position 320 associated with the viewpoint position 310. A 3D image rendering apparatus may determine a position of the viewpoint position 310 based on a viewpoint tracking scheme using a separate camera, and may determine a position of the virtual viewpoint position 320 by applying an optical transformation to the position of the viewpoint position 310. Similarly to a projected location 350 of the object, the virtual viewpoint position 320 may be determined by an optical transformation based on an optical characteristic of a concave mirror 340. Accordingly, an optical relationship between the viewpoint position 310 and the projected location 350 of the object may correspond to an optical relationship between the virtual viewpoint position 320 and a virtual object 330. For example, the 3D image rendering apparatus may assign a pixel value to a pixel of the display panel using the virtual viewpoint position 320 and the virtual object 330 instead of using the viewpoint position 310 and the projected location 350 of the object. In this example, the 3D image rendering apparatus may determine a viewpoint position corresponding to the pixel of the display panel based on the virtual viewpoint position 320, instead of applying the optical transformation to pixels of the display panel. Thus, in consideration of an influence of the concave mirror 340, an amount of calculation may be reduced.

Figure 4:
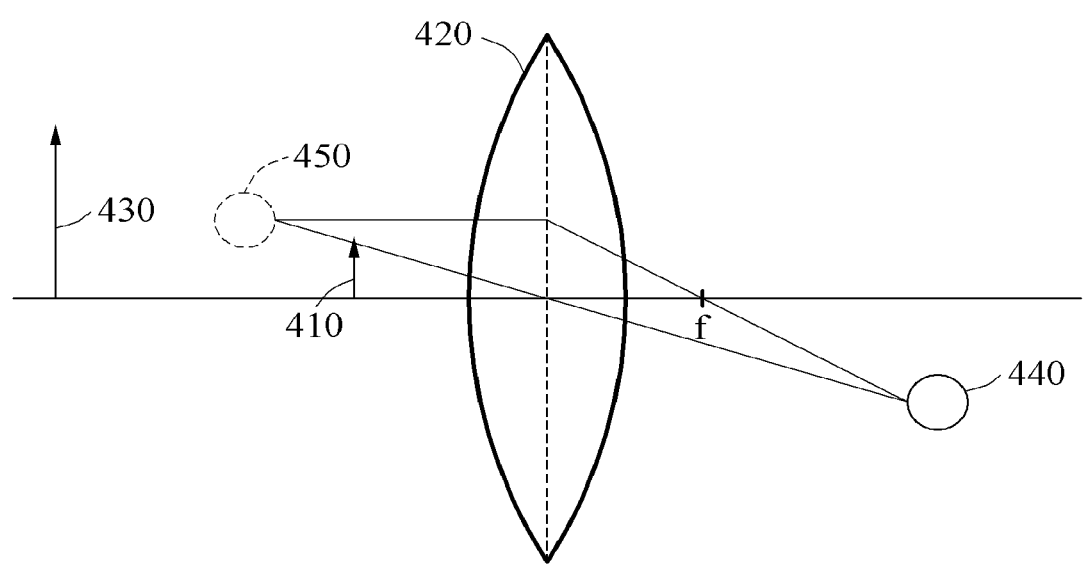
FIGS. 4 and 5 are diagrams illustrating examples of a process of rendering a 3D image using a convex lens according to an exemplary embodiment.
Figure 5:
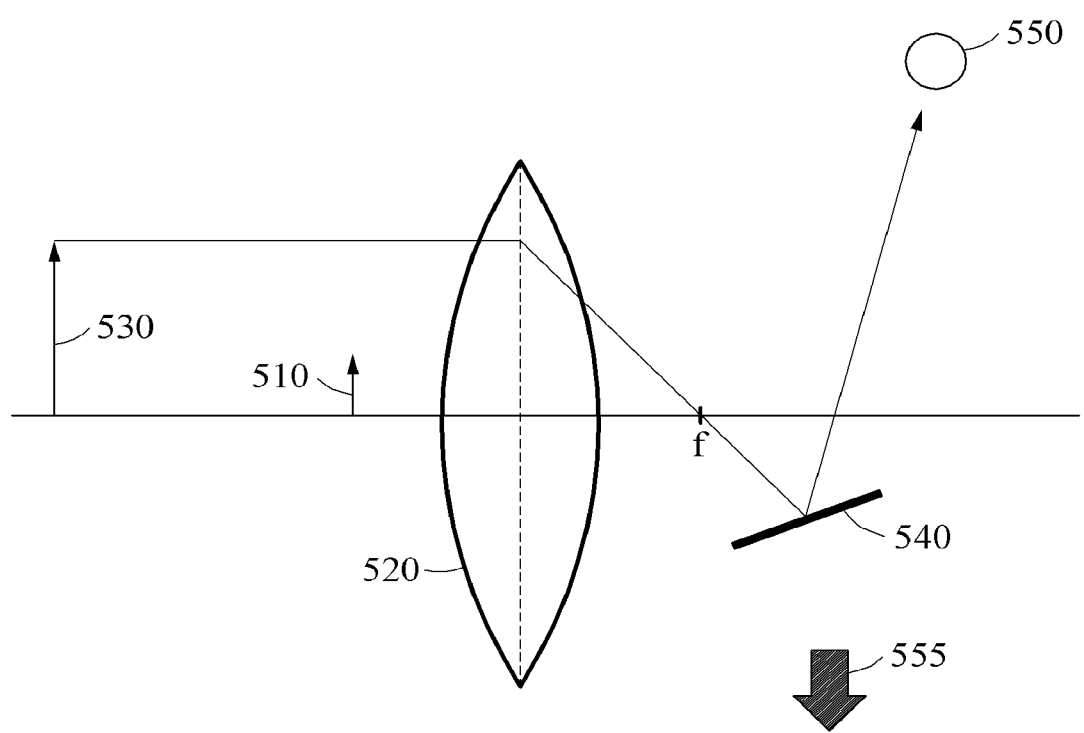

FIGS. 4 and 5 are diagrams illustrating examples of a process of rendering a 3D image using a convex lens according to an exemplary embodiment. Referring to FIG. 4, a virtual object 410 may be output by a 3D display apparatus. Accordingly, a position of the virtual object 410 may correspond to a position of the 3D display apparatus. An projected location 430 of the virtual object 410 may be determined by applying an optical transformation to the virtual object 410. The optical transformation may be performed based on an optical characteristic of the convex lens 420 including a focal point for a curve. A single convex lens is illustrated in FIGS. 4 and 5, however, the exemplary embodiment is not limited there thereto. Any of various optical systems for generating a similar optical effect to that of a single convex lens may be used instead of the convex lens.

Similarly to the examples of FIGS. 2 and 3, a 3D image rendering apparatus may assign a pixel value to a pixel of a display panel based on a relationship between the virtual object 410 and a virtual viewpoint position 450 corresponding to a viewpoint position 440, regardless of an influence on all pixels of the display panel by the convex lens 420. For example, using the convex lens 420, the projected location 430 of the object may be formed behind the display panel. In this example, it may be difficult for a user to observe the projected location 430 of the object. Accordingly, an additional optical system may be used to allow the user to observe the projected location 430 of the object.

FIG. 5 illustrates a virtual object 510 output by a 3D display apparatus, a convex lens 520, a projected location 530 of the virtual object, a plane mirror 540 and a viewpoint position 550 of a user. The plane mirror 540 may reflect a ray of the projected location 530 to allow the user to observe the projected location 530 of the virtual object. Accordingly, the user may observe the projected location 530 of the virtual object at an appropriate position. For example, a system of FIG. 5 may be implemented as a portion of an HUD, and an arrow 555 may indicate a front side of a vehicle. In this example, the plane mirror 540 may be semitransparent. Accordingly, the user may observe the projected location 530 of the virtual object while looking ahead of the vehicle.

Figure 6:
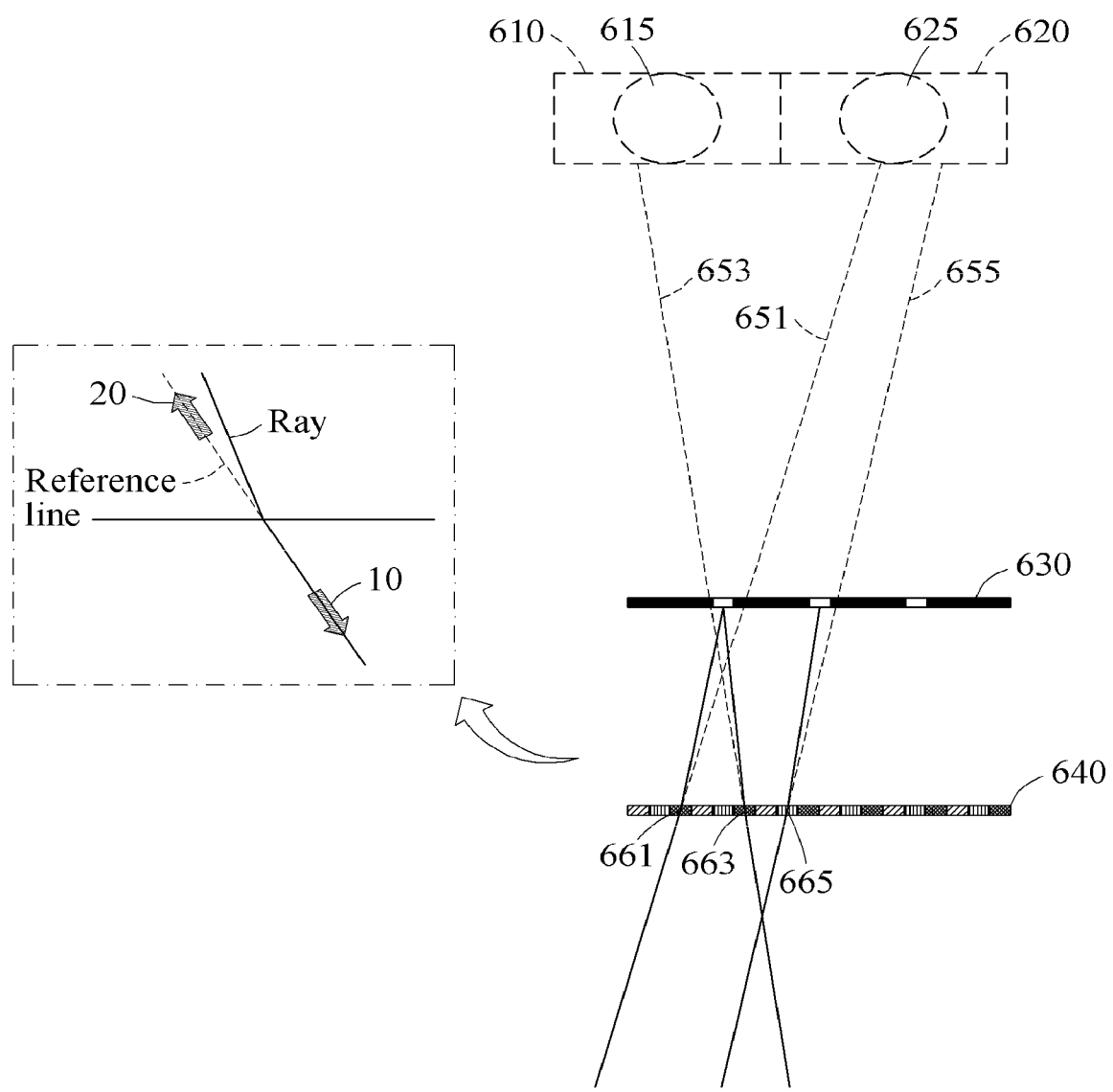
FIG. 6 is a diagram illustrating an example of a process of calculating a direction of a ray and assigning a viewpoint position according to an exemplary embodiment.

FIG. 6 is a diagram illustrating an example of a process of calculating a direction of a ray and assigning a viewpoint position according to an exemplary embodiment. In FIG. 6, rays pass through pixels of a display panel 640 and optical elements of an optical layer 630, and the optical layer 630 is located behind the display panel 640. Because the optical layer 630 is located behind the display panel 640, the optical layer 630 may be, for example, a directional BLU.

A 3D image rendering apparatus may determine rays passing through pixels of the display panel 640 and optical elements of the optical layer 630, and may determine viewpoint positions corresponding to the pixels of the display panel 640 based on directions of the rays and positions of viewpoint positions 615 and 625. The viewpoint positions 615 and 625 may be determined by applying an optical transformation to candidate viewpoint positions. For example, the viewpoint position 615 may be determined by applying the optical transformation to a first viewpoint position, and the viewpoint position 625 may be determined by applying the optical transformation to a second viewpoint position. The viewpoint positions 615 and 625 may be located behind the optical layer 630 and the display panel 640. Viewing zones 610 and 620 with a predetermined size may include the viewpoint positions 615 and 625, respectively. The viewing zones 610 and 620 may be defined based on the positions of the viewpoint positions 615 and 625.

The 3D image rendering apparatus may compare the directions of rays and the positions of the viewpoint positions 615 and 625 based on reference lines. The reference lines may be determined based on refraction directions of the rays. For example, the 3D image rendering apparatus may determine reference lines 651, 653 and 655 based on rays passing through pixels 661, 663 and 665. As described above, a refractive index of a medium disposed between the optical layer 630 and the display panel 640 may be different from a refractive index of a medium disposed outside the 3D display apparatus, and accordingly rays may be refracted towards a medium with a relatively high refractive index when passing through the display panel 640. In the present disclosure, a refraction direction of a ray may refer to a direction in which the ray is refracted and travels. An arrow 10 may indicate a refraction direction of a ray and an arrow 20 may indicate a direction opposite to the refraction direction of the ray. A reference line may be determined as a line drawn in the direction opposite to the refraction direction of the ray—i.e. the direction of the arrow 20.

The 3D image rendering apparatus may compare the reference lines 651, 653 and 655 and the positions of the viewpoint positions 615 and 625. For example, the 3D image rendering apparatus may compare the reference lines 651, 653 and 655 and the positions of the viewpoint positions 615 and 625 based on the viewing zones 610 and 620. The reference line 651 may intersect the viewing zone 620, and the reference line 653 may intersect the viewing zone 610. Accordingly, the 3D image rendering apparatus may assign a pixel value of a viewpoint position corresponding to the viewpoint position 615 to the pixel 663 corresponding to the reference line 653, and may assign a pixel value of a viewpoint position corresponding to the viewpoint position 625 to the pixels 661 and 665 corresponding to the reference lines 651 and 655.

For example, at least two rays, among rays output from a single pixel, may intersect the viewing zones 610 and 620. In this example, the 3D image rendering apparatus may select a single candidate ray, from at least two candidate rays passing through the viewing zones 610 and 620, based on a predetermined condition. For example, the 3D image rendering apparatus may select a single ray close to a center of the viewing zones 610 and 620 from at least two rays passing through the viewing zones 610 and 620. The center of the viewing zones 610 and 620 may be defined along a boundary between the viewing zone 610 and the viewing zone 620.

In another example, the 3D image rendering apparatus may select a single ray close to a center of one of the viewing zones 610 and 620, from at least two rays intersecting the viewing zones 610 and 620. For example, when a first ray intersecting a first pixel intersects a center of the viewing zone 610 and when a second ray intersecting the first pixel intersects the viewing zone 620 outside of a center of the viewing zone 620, the 3D image rendering apparatus may select the first ray.

For example, not all rays output from a second pixel may pass through the viewing zones 610 and 620. In this example, the 3D image rendering apparatus may assign a pixel value to the second pixel based on a predetermined condition. In an example, the 3D image rendering apparatus may assign, to the second pixel, a lowest pixel value in a predetermined range. Pixel values may range, for example, from "0" to "255." For example, when not all the rays output from the second pixel pass through the viewing zones 610 and 620, the 3D image rendering apparatus may assign a pixel value of "0" to the second pixel.

In another example, the 3D image rendering apparatus may assign, to the second pixel, a pixel value corresponding to a viewpoint position of the closest viewing zone to rays output from the second pixel, among viewpoint positions of the viewing zones 610 and 620. For example, when a distance between a first ray and the viewing zone 610 is less than a distance between a second ray and the viewing zone 620, even though both the first ray and the second ray do not intersect the viewing zone 610, the 3D image rendering apparatus may assign a pixel value corresponding to a viewpoint position of the viewing zone 610 to the second pixel.

The viewpoint positions 615 and 625 may correspond to a left viewpoint position and a right viewpoint position, respectively. In the example of FIG. 6, candidate viewpoint positions include two viewpoint positions for a single user, however, the exemplary embodiments are not limited thereto. Accordingly, the candidate viewpoint positions may include a preset number of viewpoint positions for multiple views. For example, when candidate viewpoint positions include a preset number of viewpoint positions for multiple views, the 3D image rendering apparatus may determine rays intersecting a pixel of a display panel and optical elements of an optical layer, and may assign a pixel value to a pixel based on directions of the rays and positions of optical images corresponding to the viewpoint positions. The preset number of viewpoint positions may be located in fixed positions, unlike the eyes of a user. Also, each of positions of the viewpoint positions may be specified by a representative position that is set in advance. The 3D image rendering apparatus may determine optical images associated with the viewpoint positions based on representative positions.

Figure 7:
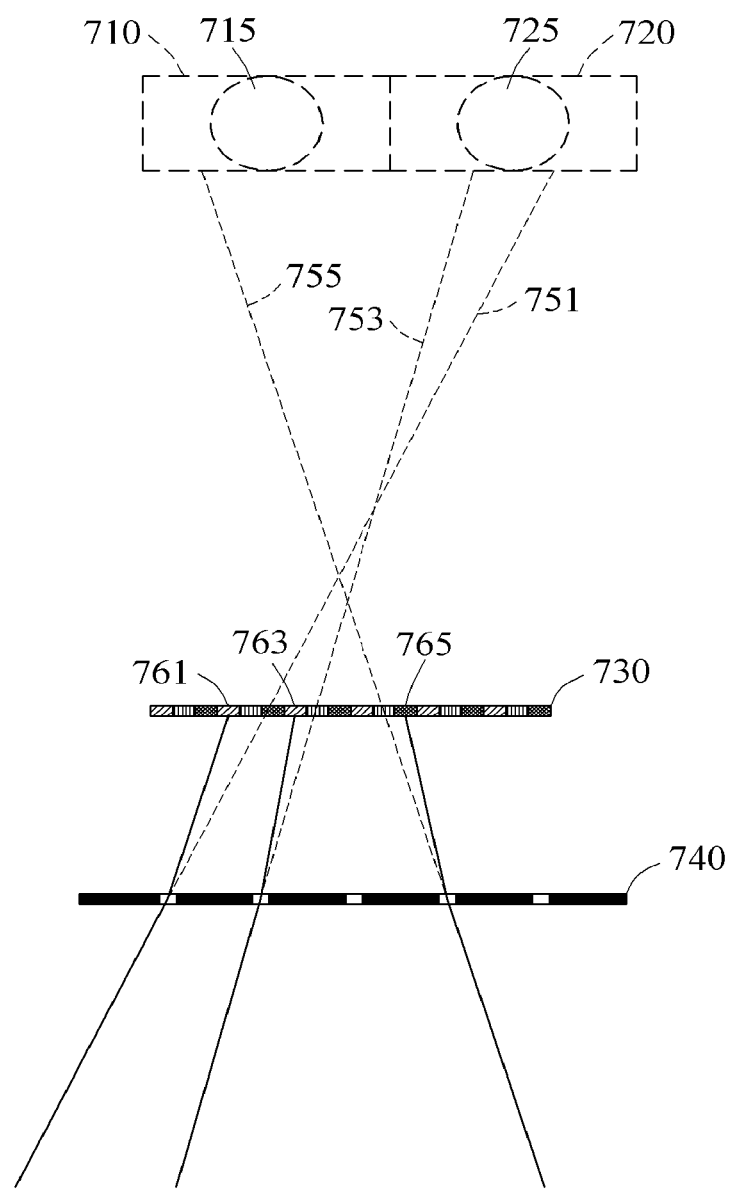
FIG. 7 is a diagram illustrating another example of a process of calculating a direction of a ray and assigning a viewpoint position according to an exemplary embodiment.

FIG. 7 is a diagram illustrating another example of a process of calculating a direction of a ray and assigning a viewpoint position according to an exemplary embodiment. In FIG. 7, rays intersect optical elements of an optical layer 740 and pixels of a display panel 730, and the optical layer 740 is located in front of the display panel 730. Because the optical layer 740 is located in front of the display panel 730, the optical layer 740 of this exemplary embodiment may be, for example, a parallax barrier or a lenticular lens.

When an optical layer is located in front of a display panel, a 3D image rendering apparatus may assign a viewpoint position based on a scheme similar to that used in an example in which the optical layer is located behind the display panel. For example, the 3D image rendering apparatus may determine reference lines 751, 753 and 755 based on refraction directions of rays, and may assign viewpoint positions to pixels of the display panel 730 based on positions of viewpoint positions 715 and 725 and the reference lines 751, 753 and 755. The reference line 755 may intersect a viewing zone 710, and the reference lines 751 and 753 may intersect a viewing zone 720. Accordingly, the 3D image rendering apparatus may assign a pixel value of a viewpoint position corresponding to the viewpoint position 715 to a pixel 765 corresponding to the reference line 755, and may assign a pixel value of a viewpoint position corresponding to the viewpoint position 725 to pixels 761 and 763 corresponding to the reference lines 751 and 753.

Figure 8:
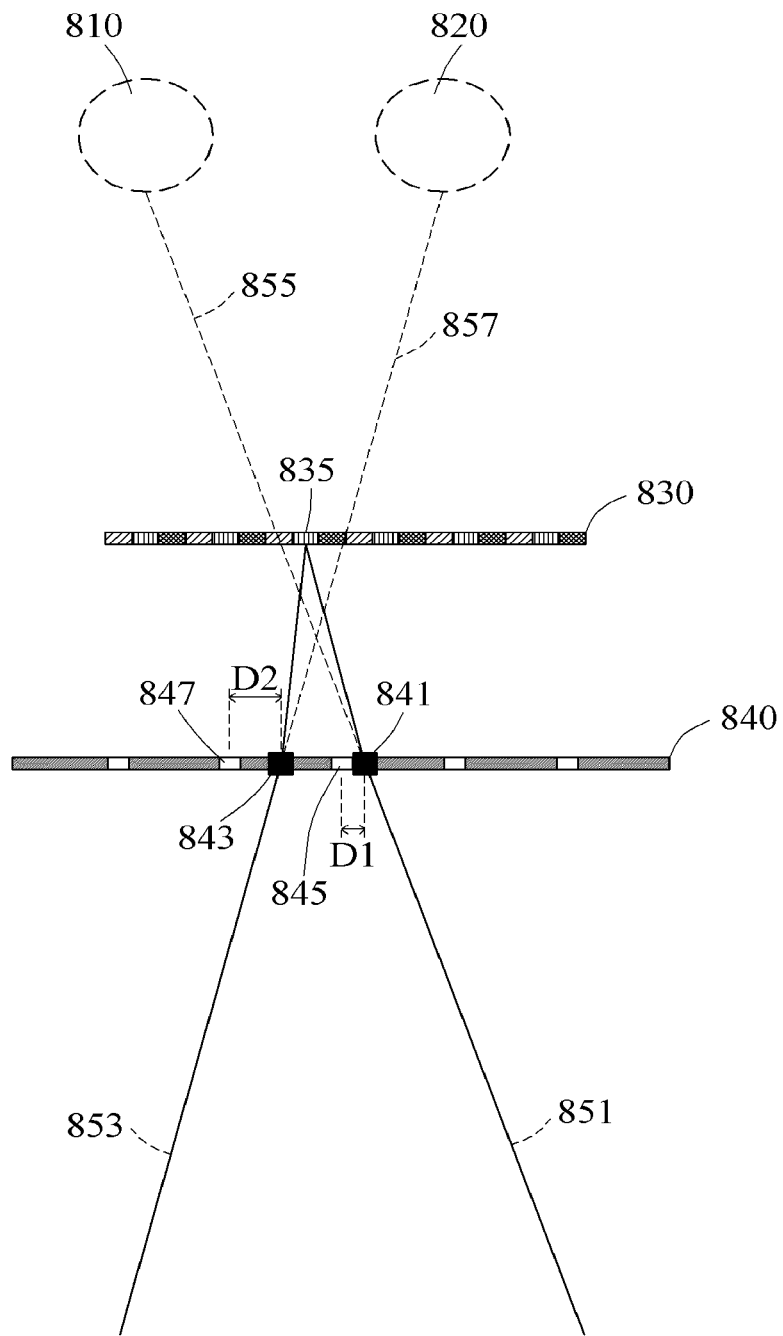
FIG. 8 is a diagram illustrating a process of assigning a viewpoint position based on an intersection point between a virtual ray and an optical layer according to an exemplary embodiment.

FIG. 8 is a diagram illustrating a process of assigning a viewpoint position based on an intersection point between a virtual ray and an optical layer according to an exemplary embodiment. In FIG. 8, virtual rays 851 and 853 intersect a pixel 835 of a display panel 830 and an optical layer 840.

A 3D image rendering apparatus may indirectly determine a viewpoint position corresponding to a pixel based on a distance between optical elements and the virtual rays 851 and 853 that are based on viewpoint positions 810 and 820. An actual ray intersecting a pixel may intersect a central point of an optical element, however, the 3D image rendering apparatus may use a virtual candidate ray intersecting a predetermined pixel and a predetermined candidate view field.

The 3D image rendering apparatus may determine the locations of the viewpoint positions 810 and 820 based on candidate viewpoint positions and may determine the virtual rays 851 and 853 based on the locations of the viewpoint positions 810 and 820. The 3D image rendering apparatus may determine the virtual rays 851 and 853 so that the viewpoint positions 810 and 820 are located in directions opposite to refraction directions of the virtual rays 851 and 853. To determine the virtual rays 851 and 853, the 3D image rendering apparatus may use reference lines 855 and 857 drawn in directions opposite to the refraction directions of the virtual rays 851 and 853. For example, the 3D image rendering apparatus may determine the virtual rays 851 and 853 so that the reference lines 855 and 857 may intersect the viewpoint positions 810 and 820. The 3D image rendering apparatus may determine the virtual rays 851 and 853 based on a first refractive index of a medium disposed between the display panel 830 and the optical layer 840 and a second refractive index of a medium disposed outside the 3D display apparatus including the display panel 830 and the optical layer 840.

When the virtual rays 851 and 853 are determined, the 3D image rendering apparatus may determine an intersection point 841 between the virtual ray 851 and the optical layer 840 and an intersection point 843 between the virtual ray 853 and the optical layer 840. The 3D image rendering apparatus may determine the intersection points 841 and 843 based on an angle of incidence and an angle of refraction of each of the virtual rays 851 and 853 that are determined based on the first refractive index and the second refractive index. An example of a process of determining the intersection points 841 and 843 will be further described with reference to FIG. 9.

When the intersection points 841 and 843 are determined, the 3D image rendering apparatus may determine a viewpoint position corresponding to the pixel 835 based on a distance D1 between the intersection point 841 and an optical element 845 of the optical layer 840 and a distance D2 between the intersection point 843 and an optical element 847 of the optical layer 840. The 3D image rendering apparatus may determine the closest intersection point to a neighboring optical element between the intersection points 841 and 843, and may assign a pixel value of a viewpoint position, corresponding to the determined intersection point, to the pixel 835. The neighboring optical element may refer to the closest optical element to an intersection point among optical elements of the optical layer 840. For example, the optical element 845 may be an optical element neighboring the intersection point 841, and the optical element 847 may be an optical element neighboring the intersection point 843. When the distance D1 is less than the distance D2, the 3D image rendering apparatus may assign a pixel value of a viewpoint position corresponding to the viewpoint position 810 to the pixel 835, because the pixel 835 is highly likely to be traversed by the virtual ray 853 rather than an actual ray adjacent to the virtual ray 854.

The viewpoint positions 810 and 820 may correspond to a left viewpoint position and a right viewpoint position. In FIG. 8, candidate viewpoint positions include two viewpoint positions for a single user, however, the exemplary embodiment is not limited thereto. Accordingly, the candidate viewpoint positions may include a preset number of viewpoint positions for multiple views. For example, when candidate viewpoint positions include a preset number of viewpoint positions for multiple views, the 3D image rendering apparatus may determine virtual rays emitted to the viewpoint positions, and may assign a pixel value corresponding to one of the viewpoint positions to a pixel based on a distance between an intersection point between each of the virtual rays and the optical layer and an optical element adjacent to the intersection point. The preset number of viewpoint positions may be in fixed positions, unlike the eyes of a user. Also, each of positions of the viewpoint positions may be specified by a representative position that is set in advance. The 3D image rendering apparatus may determine optical images associated with the viewpoint positions based on representative positions.

Figure 9:
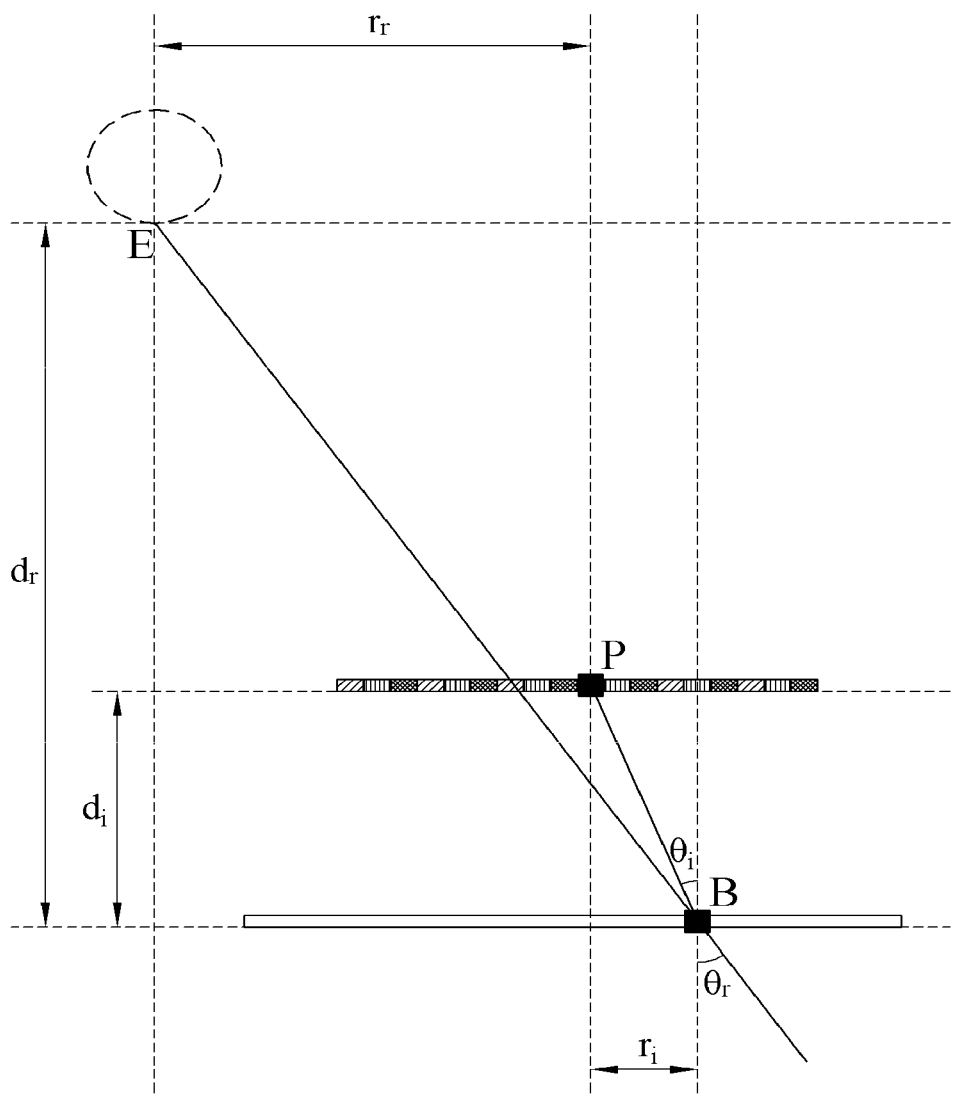
FIG. 9 is a diagram illustrating a process of determining an intersection point according to an exemplary embodiment.

FIG. 9 is a diagram illustrating a process of determining an intersection point according to an exemplary embodiment. FIG. 9 illustrates a pixel P, an intersection point B of a virtual ray and an optical layer and a viewpoint position E on an r-z plane. An r-axis may be defined as an axis corresponding to a straight line obtained by projecting a straight line connecting the viewpoint position E and the pixel P onto an x-y plane.

As described above, a 3D image rendering apparatus may determine a virtual ray intersecting the pixel P and an optical layer based on the viewpoint position E, and may determine the intersection point B between the virtual ray and the optical layer. A position of the viewpoint position E may be represented by $(x_e, y_e, z_e)$, and a position of the pixel P may be represented by $(x_p, y_p, z_p)$. A distance $r_r$ between the viewpoint position E and the pixel P on the r-axis may be represented as shown in Equation 1 below.

$$r_r = \sqrt{(x_e - x_p)^2 + (y_e - y_p)^2}$$ [Equation 1]

Also, Equation 2 may be established based on a Snell's law.

$$n_i \sin \theta_i = n_r \sin \theta_r$$ [Equation 2]

In Equation 2, $n_i$ denotes a refractive index of a medium disposed between a display panel and an optical layer, $n_r$ denotes a refractive index of a medium disposed outside the 3D display apparatus, $\theta_i$ denotes an angle of incidence of the ray on the optical layer, and $\theta_r$ denotes an angle of refraction of the ray by the optical layer. Equation 3 may be obtained based on Equation 2, and Equation 4 may be obtained based on Equation 3.

$$\frac{n_i r_i}{\sqrt{d_i^2 + r_i^2}} = \frac{n_r(r_r + r_i)}{\sqrt{d_r^2 + (r_r + r_i)^2}}$$ [Equation 3]

$$((n_i^2 - n_r^2)r_i^2 - n_r^2 d_i^2)(r_i^2 + 2r_r r_i + 2r_r^2) + n_i^2 d_r^2 r_i^2 = 0$$ [Equation 4]

In Equations 3 and 4, $r_i$ denotes a distance between the pixel P and the intersection point B on the r-axis, $d_r$ denotes a distance between the viewpoint position E and the intersection point B on a z-axis, and $d_i$ denotes a distance between the pixel P and the intersection point B on the z-axis. Equation 5 may be obtained based on Equation 4.

$$ar_i^4 + br_i^3 + cr_i^2 + dr_i^2 + e = 0$$ [Equation 5]

Coefficients in Equation 5 may be represented as shown below.

$$a = n_i^2 - n_r^2$$

$$b = 2(n_i^2 - n_r^2)r_r$$

$$c = (n_i^2 - n_r^2)r_r^2 - n_r^2 d_i^2 + n_i^2 d_r^2$$

$$d = -2n_r^2 d_i^2 r_r$$

$$e = -n_r^2 d_i^2 r_r^2$$

By solving Equation 5, four solutions of the distance $r_i$ may be obtained. The 3D image rendering apparatus may determine a smallest positive solution among the four solutions as a final solution. Also, a straight line may be formed by a point onto which the viewpoint position E is projected, a point onto which the pixel P is projected and the point onto which the intersection point B is projected in the x-y plane, and accordingly an x-coordinate and y-coordinate of the intersection point B may be obtained by Equations 6 and 7 shown below.

$$x_b - x_p = -\frac{r_i}{r_r}(x_e - x_p) \quad \text{[Equation 6]}$$

$$y_b - y_p = -\frac{r_i}{r_r}(y_e - y_p) \quad \text{[Equation 7]}$$

The 3D image rendering apparatus may obtain the x-coordinate and y-coordinate of the intersection point B by substituting the distance $r_r$ obtained by Equation 1, the final solution of the distance r obtained by Equation 5, coordinates of the viewpoint position E and coordinates of the pixel P into Equations 6 and 7. A z-coordinate of the intersection point B may be obtained based on a z-coordinate of the pixel P and a distance between a display panel and an optical layer.

Figure 10:
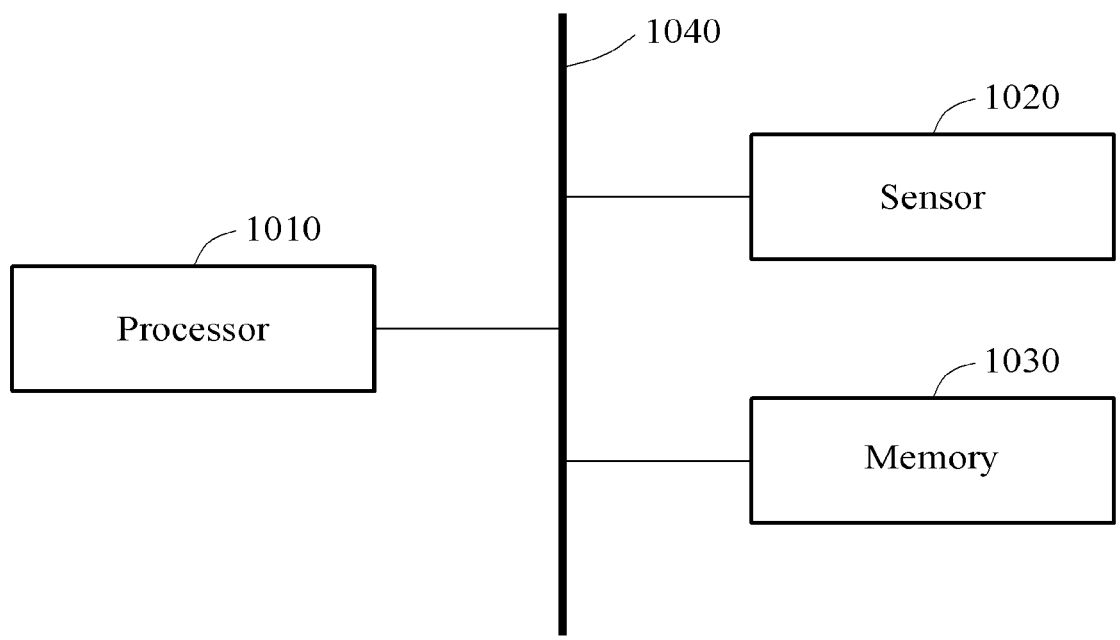
FIG. 10 is a block diagram illustrating a 3D image rendering apparatus according to an exemplary embodiment.

FIG. 10 is a block diagram illustrating a 3D image rendering apparatus according to an exemplary embodiment. Referring to FIG. 10, the 3D image rendering apparatus includes a processor 1010, a sensor 1020 and a memory 1030. The processor 1010, the sensor 1020 and the memory 1030 may communicate with each other via a bus 1040.

The sensor 1020 may detect or track eyes of a user. The sensor 1020 may include, for example, at least one of an image sensor, a proximity sensor, and an infrared sensor. The sensor 1020 may detect or track eyes of a user based on a known method, for example, a method including converting an optical image, obtained by a camera, into an electrical signal. The sensor 1020 may transmit at least one of a captured color image, a depth image, and an infrared image to at least one of the processor 1010 and the memory 1030.

The processor 1010 may include at least one of the above-described apparatuses or may perform at least one of the above-described methods. For example, the processor 1010 may execute the above-described operations associated with 3D image rendering. In an example, the processor 1010 may determine optical images associated with candidate viewpoint positions in a viewing zone, may determine virtual rays passing through a pixel of a display panel based on the optical images, may determine intersection points between the virtual rays and an optical layer, and may assign a pixel value to the pixel based on distances between the intersection points and optical elements of the optical layer. In another example, the processor 1010 may determine optical images associated with candidate viewpoint positions in a viewing zone, may determine rays passing through a pixel of a display panel and optical elements of an optical layer, may compare directions of the rays and positions of the optical images, and may assign a pixel value to the pixel based on a comparison result.

The memory 1030 may store computer-readable instructions. When instructions stored in the memory 1030 are executed by the processor 1010, the processor 1010 may execute operations associated with 3D image rendering. Also, the memory 1030 may store data associated with the above-described 3D image rendering.

The processor 1010 may execute instructions or programs, or may control the 3D image rendering apparatus. The 3D image rendering apparatus may be connected to an external device (for example, a personal computer (PC) or a network) via an input/output device (not shown), and may exchange data with the external device. The 3D image rendering apparatus may be implemented as at least a portion of, for example, a mobile device such as a mobile phone, a smartphone, a personal digital assistant (PDA), a tablet computer or a laptop computer, a computing device such as a PC or a netbook, and an electronic product such as a television (TV), a smart TV or a security device for gate control, and various electronic systems such as autonomous vehicles. Also, the 3D image rendering apparatus may be implemented as a portion of an HUD. The above description is also applicable to the 3D image rendering apparatus, and accordingly is not repeated here.

Figure 11:
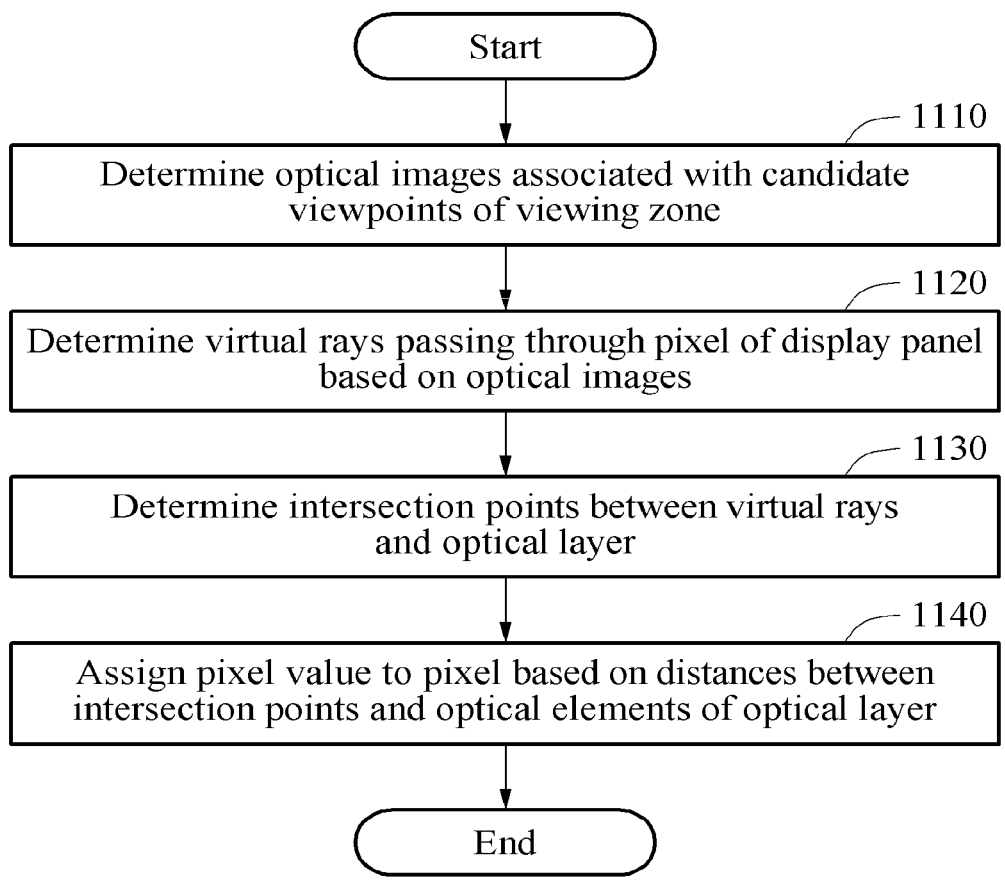
FIG. 11 is a flowchart illustrating an example of a 3D image rendering method according to an exemplary embodiment.

FIG. 11 is a flowchart illustrating an example of a 3D image rendering method according to an exemplary embodiment. Referring to FIG. 11, in operation 1110, a 3D image rendering apparatus determines locations of optical images associated with candidate viewpoint positions in a viewing zone. In operation 1120, the 3D image rendering apparatus determines virtual rays passing through a pixel of a display panel based on the optical images. In operation 1130, the 3D image rendering apparatus determines intersection points between the virtual rays and an optical layer. In operation 1140, the 3D image rendering apparatus assigns a pixel value to the pixel based on distances between the intersection points and optical elements of the optical layer. The above description is also applicable to the 3D image rendering method of FIG. 11, and accordingly is not repeated here.

Figure 12:
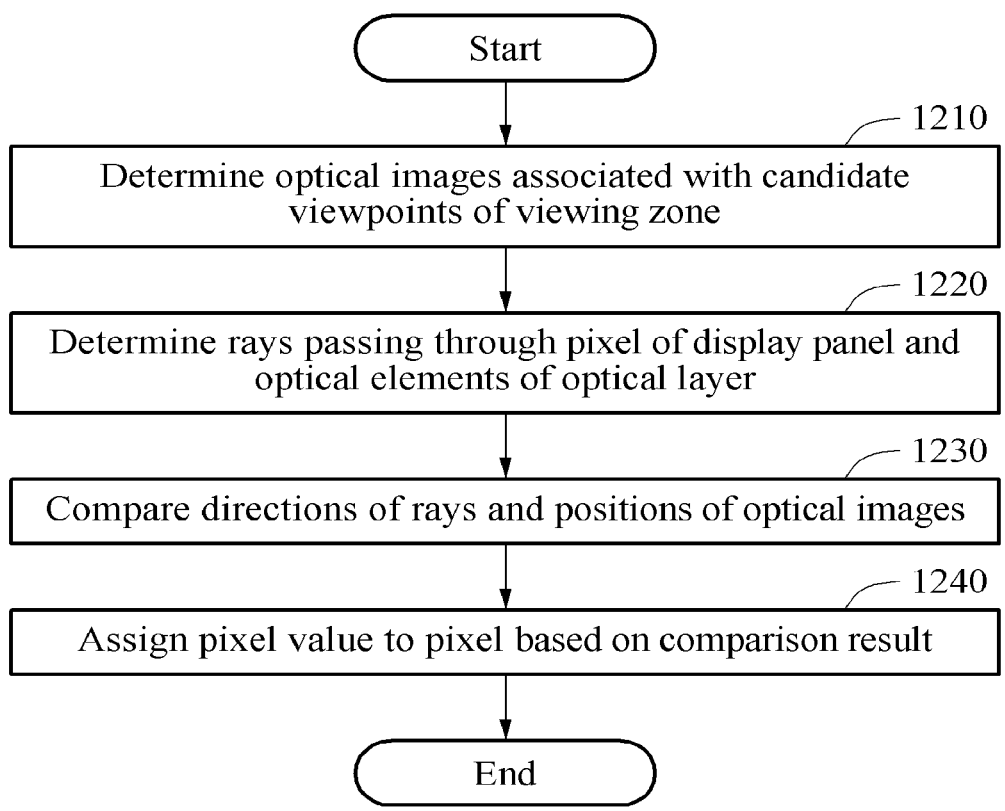
FIG. 12 is a flowchart illustrating another example of a 3D image rendering method according to an exemplary embodiment.

FIG. 12 is a flowchart illustrating another example of a 3D image rendering method according to an exemplary embodiment. Referring to FIG. 12, in operation 1210, a 3D image rendering apparatus determines locations of optical images associated with candidate viewpoint positions in a viewing zone. In operation 1220, the 3D image rendering apparatus determines rays passing through a pixel of a display panel and optical elements of an optical layer. In operation 1230, the 3D image rendering apparatus compares directions of the rays and positions of the optical images. In operation 1240, the 3D image rendering apparatus assigns a pixel value to the pixel based on a comparison result. The above description is also applicable to the 3D image rendering method of FIG. 12, and accordingly is not repeated here.

The exemplary embodiments described herein may be implemented using hardware components, software components, or a combination thereof. A processing device may be implemented using one or more general-purpose or special purpose hardware computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical equipment, virtual equipment, or computer storage medium or device capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

While this disclosure includes exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A three-dimensional (3D) image rendering method for a heads-up display (HUD) system comprising a 3D display apparatus and a catadioptric system, the 3D image rendering method comprising:
   acquiring positions of both eyes of a user;
   determining positions of optical images of the eyes by optically refracting or reflecting the acquired positions of the eyes, based on a focal point and an optical axis of the catadioptric system comprising a concave mirror or a convex lens, the optical images of the eyes comprising virtual viewpoints of the eyes;
   determining a direction of a ray passing through a pixel included in a display panel included in the 3D display apparatus and an optical element of an optical layer included in the 3D display apparatus based on a virtual viewpoint of an eye, the direction of the ray comprising a direction in which a transmission path of the ray is extended toward a rear surface of the display panel; and
   rendering an image to be displayed on the display panel to provide the user with a 3D image by determining a value of the pixel based on the determined direction of the ray and the determined positions of the optical images of the virtual viewpoints of the eyes,
   wherein an optical path determined by an acquired position of the eye and a direction of a ray, extended toward a front surface of the display panel and refracted or reflected by the catadioptric system, passing through the pixel and the optical element corresponds to an optical path determined by a determined position of an optical image of the eye and the direction of the ray, extended toward the rear surface of the display panel, passing through the pixel and the optical element,
   wherein the HUD system is implemented in a vehicle, and
   wherein the catadioptric system is configured to receive rays of the rendered image, and adjust respective directions of the received rays such that rays exiting the catadioptric system reach the eyes of the user through a front side of the vehicle.

2. The 3D image rendering method of claim 1, wherein the rendering the image comprises:
   determining sampling information for determining a pixel value, by comparing the optical images and the direction of the ray.

3. The 3D image rendering method of claim 1, wherein the determining the direction of the ray comprises:
   determining rays passing through the pixel included in the display panel, based on the determined positions of the optical images; and
   determining intersection points between the determined rays and the optical layer, the optical layer being a parallax barrier or a lenticular lens, and the display panel being interposed between the acquired positions of the eyes and the optical layer.

4. The 3D image rendering method of claim 1, wherein the direction of the ray is determined further based on a first refractive index of a medium disposed between the display panel and the optical layer and a second refractive index of a medium disposed outside the 3D display apparatus.

5. The 3D image rendering method of claim 1, wherein the optical images are located behind the display panel.

6. The 3D image rendering method of claim 3, further comprising assigning the pixel value to the pixel, based on distances respectively between the determined intersection points and optical elements of the optical layer,
   wherein the rendering comprises rendering the image, based on the assigned pixel value.

7. A non-transitory computer-readable storage medium storing a program for causing a processor to perform the method of claim 1.

8. A heads-up display (HUD) system comprising:
   a three-dimensional (3D) display apparatus configured to display an image;
   a catadioptric system comprising a concave mirror or a convex lens configured to magnify the image that is output by the 3D display apparatus, and transfer the magnified image to a user;
   a processor configured to:
      acquire positions of both eyes of the user;
      determine positions of optical images of the eyes by optically reflecting or refracting the acquired positions of the eyes, based on a focal point of the catadioptric system, the optical images of the eyes comprising virtual viewpoints of the eyes;

determine a direction of a ray passing through a pixel included in a display panel included in the 3D display apparatus and an optical element of an optical layer included in the 3D display apparatus based on the virtual viewpoints of the eyes, the direction of the ray comprising a direction in which a transmission path of the ray is extended toward a rear surface of the display panel; and render an image to be displayed on the display panel to provide the user with a 3D image, based on the determined direction of the ray and the determined positions of the optical images of the virtual viewpoints, wherein an optical relationship between the acquired positions of the eyes and a projected location of the image corresponds to an optical relationship between the virtual viewpoints of the eyes and image, wherein the HUD system is implemented in a vehicle, and wherein the catadioptric system is further configured to receive rays of the rendered image, and adjust respective directions of the received rays such that rays exiting the catadioptric system reach the eyes of the user through a front side of the vehicle.

9. The HUD system of claim 8, wherein the processor is further configured to:

determine sampling information for determining a pixel value, by comparing the optical images and the direction of the ray.

10. The HUD system of claim 8, wherein, to determine the direction of the ray, the processor is configured to:

determine rays passing through the pixel included in the display panel, based on the determined positions of the optical images; and determine intersection points between the determined rays and the optical layer, the optical layer being a parallax barrier or a lenticular lens, and the display panel being interposed between the acquired positions of the eyes and the optical layer.

11. The HUD system of claim 8, wherein the direction of the ray is determined further based on a first refractive index of a medium disposed between the display panel and the optical layer and a second refractive index of a medium disposed outside the 3D display apparatus.

12. The HUD system of claim 10, wherein the processor is further configured to:

assign the pixel value to the pixel, based on distances respectively between the determined intersection points and optical elements of the optical layer; and render the image, based on the assigned pixel value.

13. The method of claim 1, further comprising: displaying the rendered image on the display panel.

* * * * *